(No Model.)  3 Sheets—Sheet 1.

C. P. HIGGINS.
MACHINE FOR MAKING ENDS FOR HEADERS OR OTHER PURPOSES.

No. 503,966. Patented Aug. 29, 1893.

Witnesses
Chas. Hanimann
N. Marler

Inventor
Campbell P. Higgins
By his Attorney
Chas. W. Forbes (No Model.) 3 Sheets—Sheet 2.
C. P. HIGGINS.
MACHINE FOR MAKING ENDS FOR HEADERS OR OTHER PURPOSES.
No. 503,966. Patented Aug. 29, 1893.

Witnesses
Chas Hanimann
N. Marler

Inventor
Campbell P. Higgins
By his Attorney
Chas. W. Forler (No Model.) 3 Sheets—Sheet 3.
C. P. HIGGINS.
MACHINE FOR MAKING ENDS FOR HEADERS OR OTHER PURPOSES.
No. 503,966. Patented Aug. 29, 1893.

Witnesses
Chas. Hanimann
N. Marler

Inventor
Campbell P. Higgins
By his Attorney
Chas. W. Forbes

UNITED STATES PATENT OFFICE.

CAMPBELL P. HIGGINS, OF NEW YORK, N. Y.

MACHINE FOR MAKING ENDS FOR HEADERS OR OTHER PURPOSES.

SPECIFICATION forming part of Letters Patent No. 503,966, dated August 29, 1893.

Application filed July 5, 1892. Serial No. 439,067. (No model.)

*To all whom it may concern:*

Be it known that I, CAMPBELL P. HIGGINS, a citizen of the United States, residing in the city, county, and State of New York, have invented certain new and useful Improvements in Machines for Making Ends for Headers or other Purposes, of which the following is a specification.

The present machine embodying the invention is designed for cutting end pieces for headers for sectional steam boilers, or other metallic boxes which are made from a tube of rectangular or other cross-sectional form, and comprises a die press adapted both for cutting the external margin of the plate and also a tube hole or other aperture therethrough; the operations being performed independently at different times, but without material change in the parts of the machine.

In order that others may understand and use the invention, I will first proceed to describe a machine embodying the same and subsequently point out in the claims its novel features.

Figure 4:
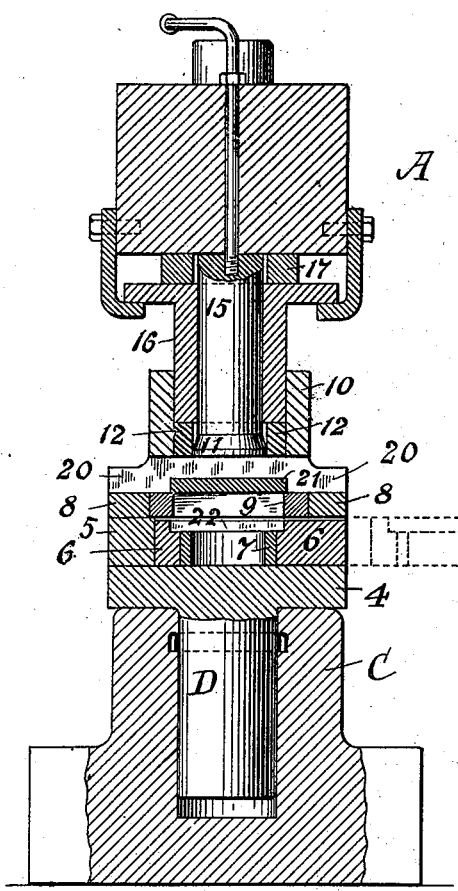
Figure 1:
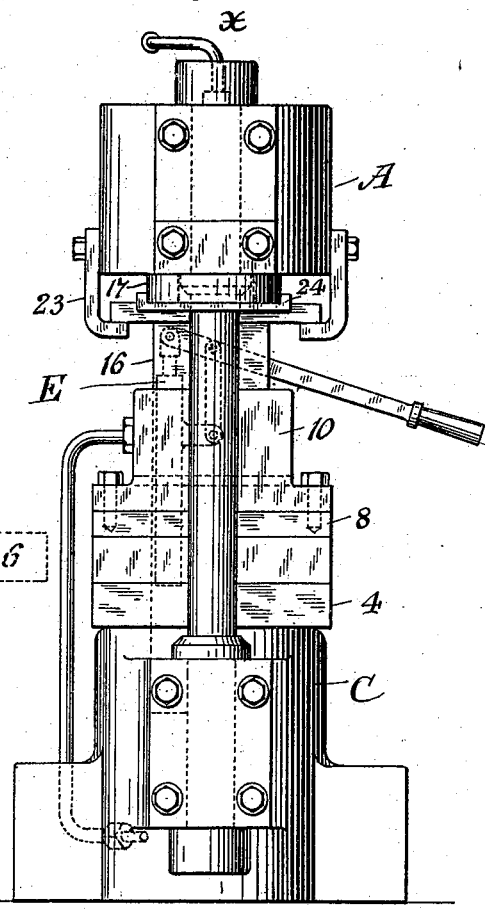
Figure 5:
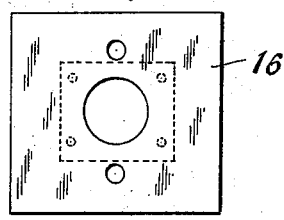
Figure 7:
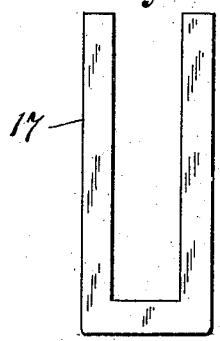
Figure 6:
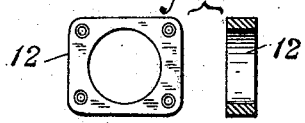
Figure 2:
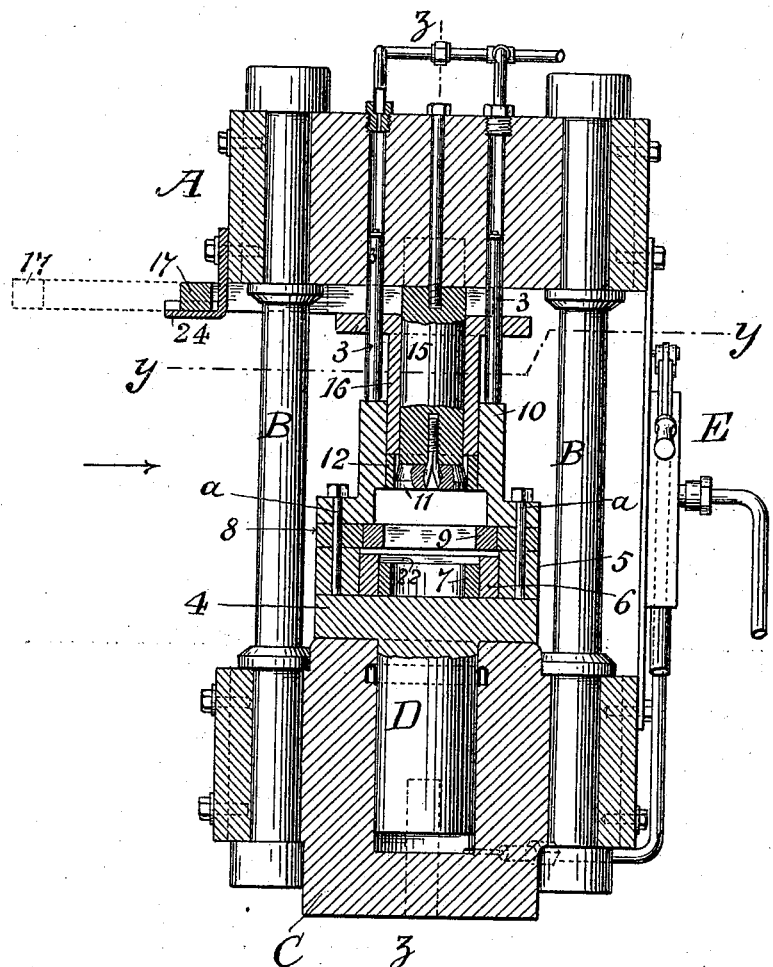
Figure 3:
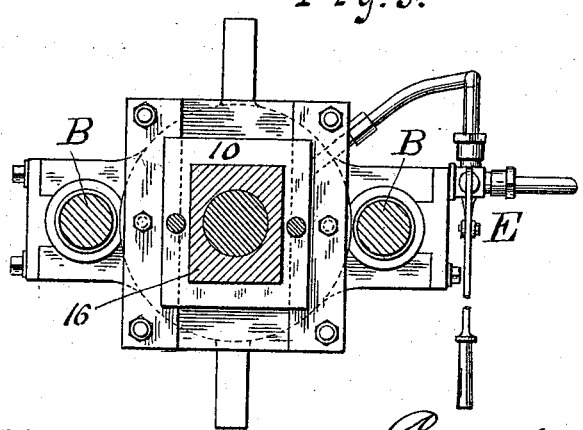
Figure 8:
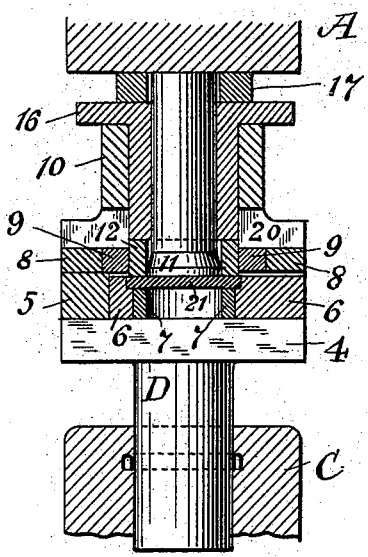
Figure 9:
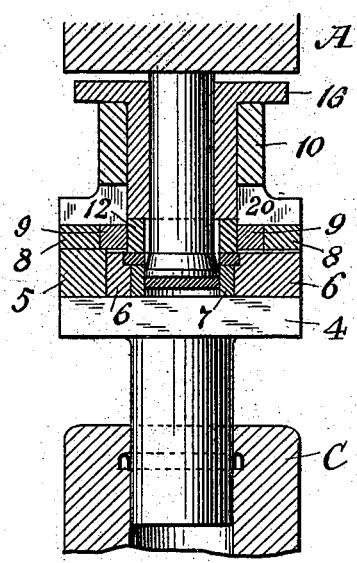
Figure 10:
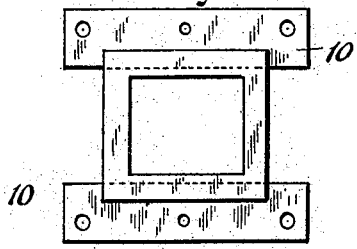
Figure 12:
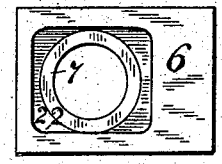
Figure 11:
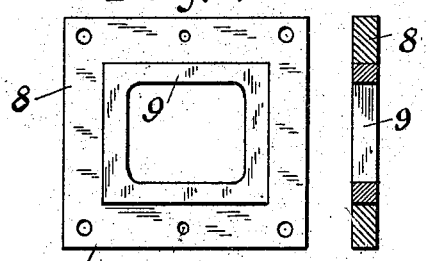
Figure 13:
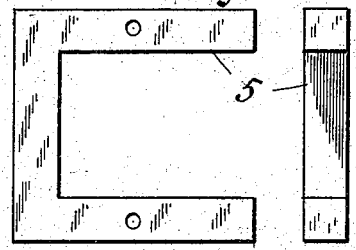

Referring to the accompanying drawings, in which similar characters of reference indicate corresponding parts throughout the several views:—Figure 1, is a side elevation of the machine; Fig. 2, a front sectional elevation taken on the line $x$—$x$, Fig. 1; Fig. 3, a horizontal section on the line $y$—$y$, Fig. 2; Fig. 4, a sectional side elevation taken on the line $z$—$z$, Fig. 2; Fig. 5, a detail plan view of the abutment sleeve for the shaping die; Fig. 6, a detail view and cross-sectional views respectively of the metal shaping die; Fig. 7, a detail view showing a plan of the intercepting block for determining the advanced or retracted position of the metal shaping die; Figs. 8 and 9, detail views showing in vertical section various positions of the dies; Fig. 10, a top plan view of the support for the abutment of the metal shaping die, forming also the channel for introducing and removing the work; Fig. 11, a plan and cross-sectional view respectively of the female shaping die; Fig. 12, a plan view of the support for the same, showing also the female perforating die therein; Fig. 13, a plan and end view respectively of the receptacle for the piece in Fig. 12.

The upper or elevated stationary head A, of the machine is supported by columns B, B, upon the bed C, which contains the hydraulic ram D, for actuating the dies, the latter being retracted by means of auxiliary rams 3, 3, subsequent to each operation, a suitable apparatus being provided for controlling the water, indicated at E, Figs. 2 and 3. Upon the head 4, of the ram D, is placed a die holder 5, which contains a die support 6, and the female perforating die 7, these parts being held in place and to the collar 10 by means of the bolts $a$, $a$, Fig. 2, which when removed allows the support 6 to be removed as shown in the dotted lines Fig. 4. Upon the holder 5, rests the holder 8, containing the female shaping die 9, and upon the holders 5, and 8, thus superimposed, is bolted the guiding collar 10, which binds the aforesaid parts together, as shown in Fig. 1, and which embraces and slides upon the upper die 12.

11, is a male perforating die, and 12, the male shaping die adapted to fit and co-operate with the dies 7, and 9, respectively. In the illustration, the dies 11, and 7, have circular steel cutting edges, while the dies 12, and 9, of steel, present a rectangular contour.

The die 11, is composed of a separate block retained on the stationary head 15, by means of a split spring nipple, as shown in Fig. 2, which expands into the concaved hole through the said block 11, when the latter is inserted. The sleeve 16, upon which the confining collar 10, slides, also serves as an abutment for the die 12, and according as such die 12, is intended to be placed in an active or inactive position, such sleeve 16, is advanced or retracted accordingly. In its advanced position the sleeve is supported as shown in Fig. 2, by means of the intercepting piece 17, shown separately in Fig. 7. The bottom of the confining sleeve 10, is provided with a through channel 20, for the introduction of the plate 21.

In the operation of the machine, the plate 21 is inserted in position through the channel 20, as shown at Fig. 4. The ram D, is advanced, carrying with it the head 4, the interposed lower dies, and the confining sleeve 10, moving them upward over the annular sleeve or abutment 16 of the die 12. The edges of the work are thus sheared or trimmed off between the dies 9, and 12, the scrap lying in the channel 20, while the plate passes through the die 9, into the cavity 22, as shown in Fig. 8, from whence it may be subsequently removed, if desired, without further operation.

To perforate the plate 21, if desired, the ram D is partially retracted and the support 17, of the abutment 16, is removed, and the ram again advanced. The die 12, and its abutment will then move idly, the perforating die 11, remaining fixed and thereby the lower perforating die 7, telescoping it, will perforate the plate held in the cavity 22, as shown in Fig. 9.

Having thus fully described the invention, what I claim, and desire to secure by Letters Patent, is—

1. In a press for shaping and perforating plates, the combination of two male dies, one for shaping the plate, the other for perforating it, and suitable female dies in alignment therewith, together with means for adjusting one of said male dies with reference to the other in different fixed positions; the one wherein the perforating die projects in advance of the shaping die; the other wherein the shaping die is brought flush or in advance of the said perforating die for the purposes set forth.

2. A press fitted with compound dies substantially as described, in combination with telescoping cylinders attached to the respective heads of the press independent of the dies for holding and guiding said dies, substantially as described.

3. A press fitted with compound dies substantially as described, combined with telescoping cylinders attached to the respective heads of the press for holding and guiding the dies, and provided with a lateral channel therethrough extending between the dies for the reception of the plate, substantially as described.

CAMPBELL P. HIGGINS.

Witnesses:
NAT. M. PRATT,
FRANCIS L. WARD.